United States Patent
Chang et al.

(10) Patent No.: US 10,449,870 B2
(45) Date of Patent: Oct. 22, 2019

(54) BATTERY CHARGE STRATEGY USING DISCHARGE CYCLE

(71) Applicant: FORD GLOBAL TECHNOLOGIES, LLC, Dearborn, MI (US)

(72) Inventors: Xiaoguang Chang, Northville, MI (US); Szushen Ho, Plymouth, MI (US); Xu Wang, Dearborn, MI (US); Chuan He, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/681,746

(22) Filed: Aug. 21, 2017

(65) Prior Publication Data

US 2017/0341520 A1 Nov. 30, 2017

Related U.S. Application Data

(62) Division of application No. 14/664,281, filed on Mar. 20, 2015, now abandoned.

(51) Int. Cl.
*H02J 7/00* (2006.01)
*B60L 11/18* (2006.01)
(Continued)

(52) U.S. Cl.
CPC ............ *B60L 11/187* (2013.01); *B60L 50/50* (2019.02); *B60L 53/11* (2019.02); *B60L 53/665* (2019.02); *B60L 58/13* (2019.02); *B60L 58/24* (2019.02); *H01M 10/44* (2013.01); *H02J 7/008* (2013.01); *B60L 2240/545* (2013.01); *B60L 2240/547* (2013.01); *H01M 2220/20* (2013.01); *Y02T 10/7005* (2013.01); *Y02T 10/705* (2013.01); *Y02T 10/7044* (2013.01);
(Continued)

(58) Field of Classification Search
CPC ......... H02J 7/007; H02J 7/008; B60L 11/187; B60L 11/1848; B60L 11/1862
USPC ................................ 320/134, 136, 152, 157
See application file for complete search history.

(56) References Cited

U.S. PATENT DOCUMENTS 5,654,622 A * 8/1997 Toya ..................... H01M 10/44
320/129
5,710,506 A * 1/1998 Broell ................... H02J 7/0073
320/145

(Continued)

FOREIGN PATENT DOCUMENTS

DE 102010017504 A1 12/2011
WO 2014191794 A1 12/2014

*Primary Examiner* — Edward Tso
*Assistant Examiner* — Aaron Piggush
(74) *Attorney, Agent, or Firm* — David Kelley; Brooks Kushman P.C.

(57) ABSTRACT

A battery management system for a vehicle includes a controller programmed to charge a battery at a predetermined charge current. The controller activates an electrical load to discharge the battery for a predetermined time in response to a charge current of the battery becoming less than the predetermined charge current at a predetermined voltage limit. After discharging for the predetermined time, the controller resumes charging at the predetermined charge current. A current magnitude during the discharge and the predetermined time may be based on factors including the predetermined charge rate, a battery temperature, and a charge current magnitude during charging.

17 Claims, 5 Drawing Sheets

(51) Int. Cl.
   *H01M 10/44*   (2006.01)
   *B60L 50/50*   (2019.01)
   *B60L 53/66*   (2019.01)
   *B60L 53/10*   (2019.01)
   *B60L 58/13*   (2019.01)
   *B60L 58/24*   (2019.01)

(52) U.S. Cl.
   CPC .......... *Y02T 10/7072* (2013.01); *Y02T 90/121* (2013.01); *Y02T 90/128* (2013.01); *Y02T 90/14* (2013.01); *Y02T 90/169* (2013.01); *Y04S 30/14* (2013.01)

(56) References Cited

U.S. PATENT DOCUMENTS

| | | |
|---|---|---|
| 5,719,506 A | 2/1998 | Sholeh et al. |
| 5,998,968 A | 12/1999 | Pittman et al. |
| 6,232,750 B1 | 5/2001 | Podrazhansky et al. |
| 6,388,425 B1 * | 5/2002 | Petrovic ............... H02J 7/0093 320/130 |
| 6,646,419 B1 | 11/2003 | Ying |
| 7,449,862 B1 | 11/2008 | Voor et al. |
| 7,932,702 B1 | 4/2011 | Patino et al. |
| 8,447,544 B2 | 5/2013 | Hsu et al. |
| 8,645,088 B2 | 2/2014 | Schaefer et al. |
| 2004/0219399 A1 | 11/2004 | Zhu et al. |
| 2012/0101501 A1 | 5/2012 | Lin et al. |
| 2013/0185008 A1 | 7/2013 | Itabashi et al. |
| 2013/0314042 A1 | 11/2013 | Boehm et al. |
| 2014/0253023 A1 | 9/2014 | Paryani et al. |
| 2014/0333317 A1 | 11/2014 | Frost et al. |
| 2014/0375275 A1 | 12/2014 | Hung et al. |

\* cited by examiner

BATTERY CHARGE STRATEGY USING DISCHARGE CYCLE

CROSS-REFERENCE TO RELATED APPLICATIONS

This application is a divisional of U.S. application Ser. No. 14/664,281 filed Mar. 20, 2015, now abandoned, the disclosure of which is hereby incorporated in its entirety by reference herein.

TECHNICAL FIELD

This application is generally related to charging lithium-ion based traction batteries.

BACKGROUND

Batteries for electric and plug-in hybrid vehicles are charged between uses to restore energy to the battery for the next use cycle. A vehicle may be connected to a charger that is connected to a power source. The charger is controlled to provide voltage and current to the battery to restore energy to the battery. Different charging strategies are utilized to charge the battery in the vehicle. Present charging strategies may charge the battery at a constant current until a voltage limit is reached. When the voltage limit is reached, charging at a constant voltage may be initiated. During the constant voltage phase, the battery current decreases which results in a slower charge rate.

SUMMARY

A battery management system includes a controller programmed to charge a battery at a predetermined charge current and, in response to a charge current of the battery becoming less than the predetermined charge current at a predetermined voltage limit, activate an electrical load to discharge the battery for a predetermined time and resume charging after the predetermined time at the predetermined charge current to reduce battery charge time.

A vehicle includes an electrical load, a battery and at least one controller. The at least one controller is programmed to charge the battery at a predetermined charge current and, in response to a charge current of the battery becoming less than the predetermined charge current at a predetermined voltage limit, operate the electrical load to discharge the battery for a predetermined time and resume charging after the predetermined time at the predetermined charge current to reduce battery charge time.

A method includes charging a battery at a predetermined charge current. The method further includes operating an electrical load to discharge the battery for a predetermined time in response to a charge current of the battery becoming less than the predetermined charge current at a predetermined voltage limit. The method further includes resuming charging the battery after the predetermined time at the predetermined charge current to reduce a battery charge time. The method may further include terminating the charging when a state of charge of the battery exceeds a predetermined state of charge indicative of a fully charged battery.

The predetermined voltage limit may be a battery charge voltage limit at which constant voltage charging is initiated. The predetermined charge current may be based on one or more of a state of charge of the battery, a temperature of the battery, and an impedance of the battery. A discharge rate magnitude during the discharge may be less than a magnitude of the predetermined charge current. A current magnitude during the discharge and the predetermined time may be based one or more of a battery temperature, a battery state of charge, and a battery impedance. The current magnitude during the discharge and the predetermined time may be based on a charge current magnitude during the charge.

The system and method described herein improves battery charging time. The battery charging time is improved by reducing or reversing battery cell polarization when a battery voltage limit is exceeded. Where prior systems are limited to a constant voltage phase with a decreasing current, the present strategy periodically adjusts the voltage and current so that a higher current flows to the battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
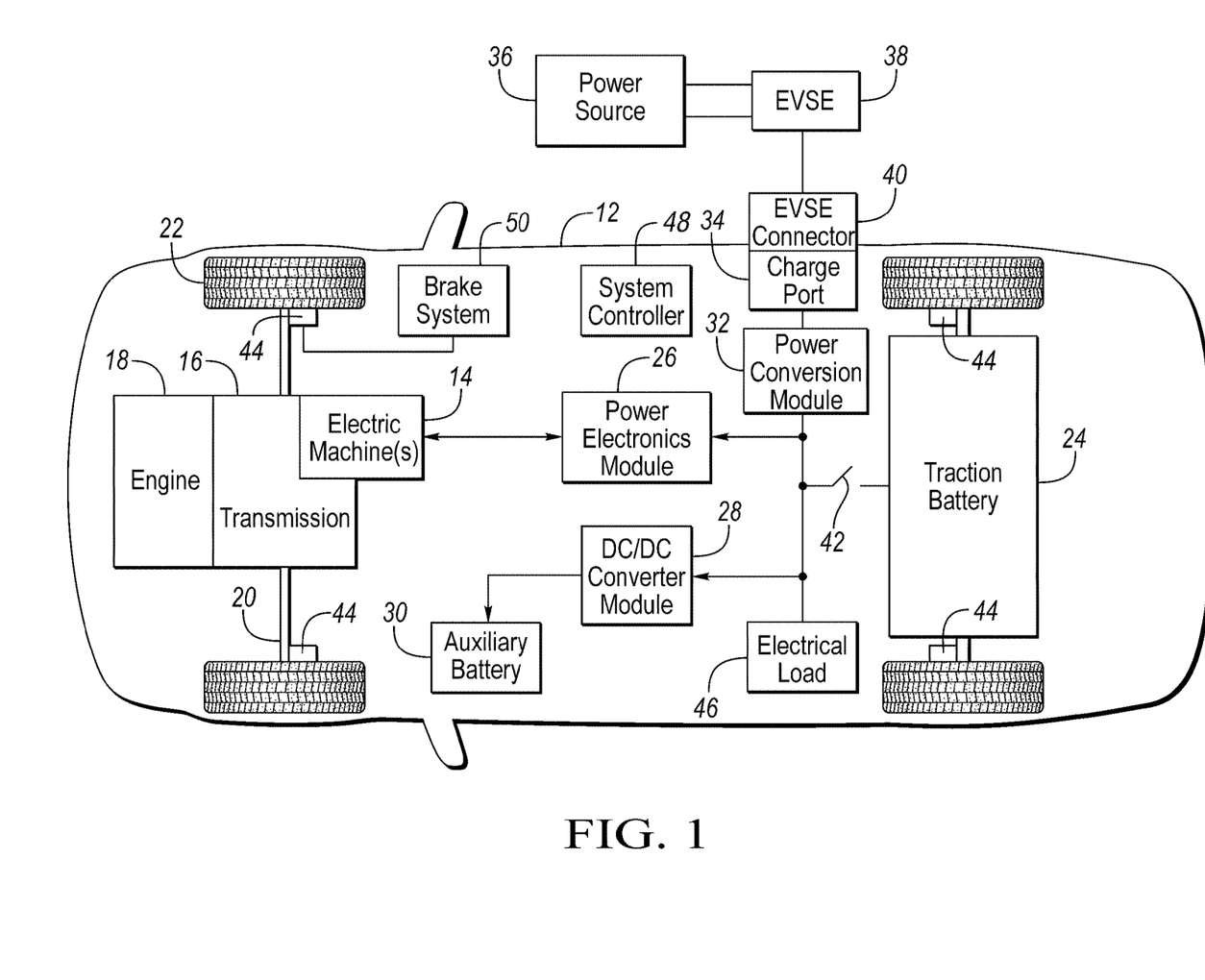
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high-voltage direct current (DC) output. The traction battery 24 is electrically coupled to one or more power electronics modules. One or more contactors 42 may isolate the traction battery 24 from other components when opened and connect the traction battery 24 to other components when closed. The power electronics module 26 is also electrically coupled to the electric machines 14 and provides the ability to bi-directionally transfer energy between the traction battery 24 and the electric machines 14. For example, a traction battery 24 may provide a DC voltage while the electric machines 14 may operate with a three-phase alternating current (AC) to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12V battery). The low-voltage systems may be electrically coupled to the auxiliary battery. Other high-voltage loads 46, such as compressors and electric heaters, may be coupled to the high-voltage output of the traction battery 24.

The vehicle 12 may be an electric vehicle or a plug-in hybrid vehicle in which the traction battery 24 may be recharged by an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands via a brake pedal and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN)) or via discrete conductors. In addition, a system controller 48 may be present to coordinate the operation of the various components.

Figure 2:
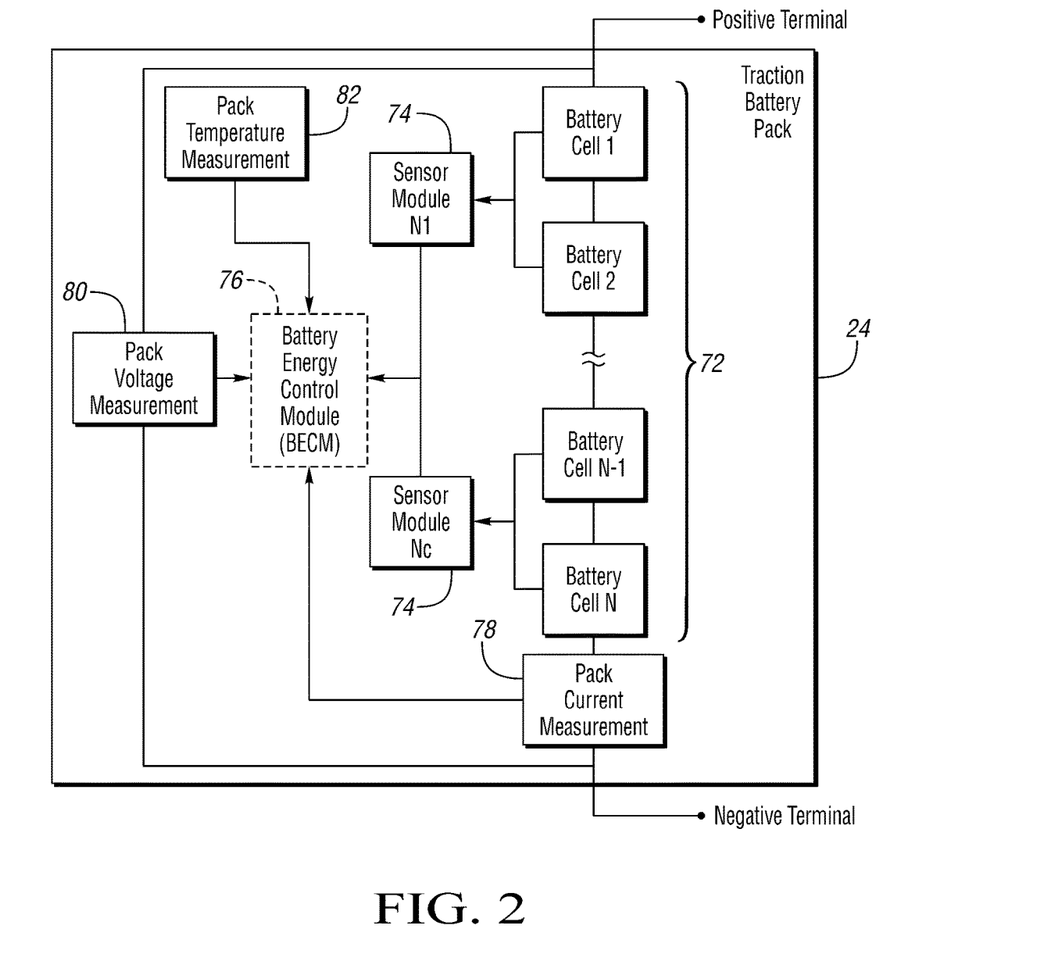
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a simple series configuration of N battery cells 72. Other battery packs 24, however, may be composed of any number of individual battery cells connected in series or parallel or some combination thereof. A battery management system may have a one or more controllers, such as a Battery Energy Control Module (BECM) 76, that monitor and control the performance of the traction battery 24. The battery pack 24 may include sensors to measure various pack level characteristics. The battery pack 24 may include one or more pack current measurement sensors 78, pack voltage measurement sensors 80, and pack temperature measurement sensors 82. The BECM 76 may include circuitry to interface with the pack current sensors 78, the pack voltage sensors 80 and the pack temperature sensors 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to $N_c$ sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some configurations, the sensor module 74 functionality may be incorporated internally to the BECM 76. That is, the sensor module 74 hardware may be integrated as part of the circuitry in the BECM 76 and the BECM 76 may handle the processing of raw signals. The BECM 76 may also include circuitry to interface with the one or more contactors 42 to open and close the contactors 42.

It may be useful to calculate various characteristics of the battery pack. Quantities such a battery power capability and battery state of charge may be useful for controlling the operation of the battery pack 24 as well as any electrical loads receiving power from the battery pack. Battery power capability is a measure of the maximum amount of power the battery 24 can provide or the maximum amount of power that the battery 24 can receive. Knowing the battery power capability allows the electrical loads to be managed such that the power requested is within limits that the battery 24 can handle.

Battery pack state of charge (SOC) gives an indication of how much charge remains in the battery pack. The SOC may be expressed as a percentage of the total charge remaining in the battery pack. The battery pack SOC may be output to inform the driver of how much charge remains in the battery pack, similar to a fuel gauge. The battery pack SOC may also be used to control the mode of operation of the electric or hybrid-electric powertrain. Calculation of battery pack SOC can be accomplished by a variety of methods. One possible method of calculating battery SOC is to perform an integration of the battery pack current over time. This is well-known in the art as ampere-hour integration.

The traction battery 24 may operate in a charging mode and a discharging mode. In the charging mode, the traction battery 24 accepts charge and the state of charge of the battery 24 may increase. Stated another way, in the charging mode, current flows into the traction battery 24 to increase the charge stored in the battery 24. In the discharging mode, the traction battery 24 depletes charge and the state of charge of the battery 24 may decrease. Stated another way, in the discharging mode, current flows from the traction battery 24 to decrease the charge stored in the battery 24. During operation of the vehicle, the traction battery 24 may be operated in alternating cycles of charging and discharging.

Figure 3:
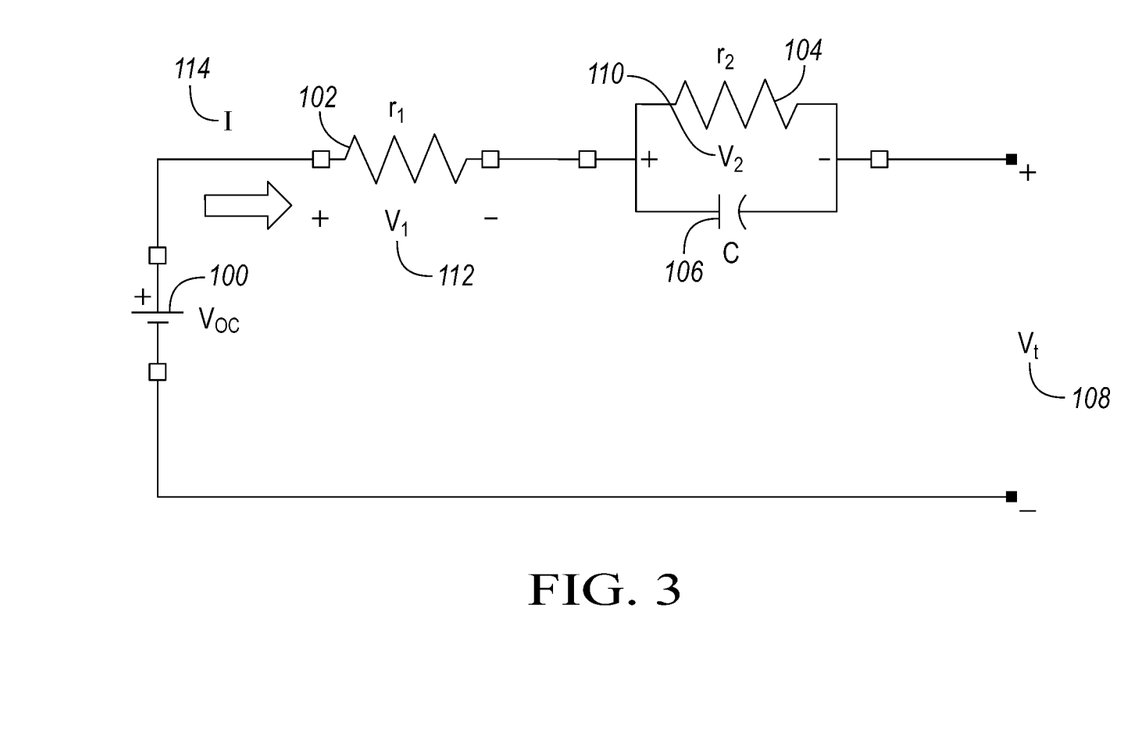
FIG. 3 is a diagram of an example battery cell equivalent circuit.

The battery cells 72 may be modeled in a variety of ways. For example, a battery cell may be modeled as an equivalent circuit. FIG. 3 shows one possible battery cell equivalent circuit model (ECM) which may be referred to as a simplified Randles circuit model. The battery cell 72 may be modeled as a voltage source 100, referred to as an open circuit voltage ($V_{oc}$), with associated impedance. The impedance may be comprised of one or more resistances (102 and 104) and a capacitance 106. The open-circuit voltage (OCV) 100 of the battery may be expressed as a function of a battery SOC and temperature. The model may include an internal resistance, $r_1$ 102, a charge transfer resistance, $r_2$ 104, and a double layer capacitance, C 106. The voltage $V_1$ 112 is the voltage drop across the internal resistance 102 due to current 114 flowing from the voltage source 100. The voltage $V_2$ 110 is the voltage drop across the parallel combination of $r_2$ 104 and C 106 due to current 114 flowing through the parallel combination. The terminal voltage ($V_t$) 108 is the voltage across the terminals of the battery. The value of the parameters $r_1$ 102, $r_2$ 104, and C 106 may depend on the cell design, temperature, and the battery chemistry. The traction battery 24 may be modeled using a similar model with aggregate impedance values derived from the battery cells 72.

The open-circuit voltage 100 may be used to determine the SOC of the battery. A relationship between battery SOC and the open-circuit voltage 100 exists such that the battery SOC may be determined if the open-circuit voltage 100 is known (e.g., SOC=f($V_{oc}$)). The relationship may be expressed as a plot or a table that may be stored in controller memory. The relationship may be derived from battery testing or battery manufacturer data.

During operation, the battery cells 72 may acquire a polarization caused by current flowing through the battery cells. The polarization effects may be modeled by the resistances 102, 104 and capacitance 106 of the equivalent circuit model. Because of the battery cell impedance, the terminal voltage, $V_t$ 108, may not be the same as the open-circuit voltage 100. The open-circuit voltage 100 is not readily measurable as only the terminal voltage 108 of the battery cell is accessible for measurement. When no current 114 is flowing for a sufficiently long period of time, the terminal voltage 108 may be the same as the open-circuit voltage 100. The voltages may be equalized after a sufficiently long period of time to allow the internal dynamics of the battery to reach a steady state. Note that after a sufficient settling time with no current flowing through the battery, the terminal voltage 108 and the open-circuit voltage 100 may be nearly equal. One technique of estimating the open-circuit voltage 100 is to wait a sufficient period of time after a battery rest period before measuring the terminal voltage 108 to ensure that the voltages are close.

Figure 5:
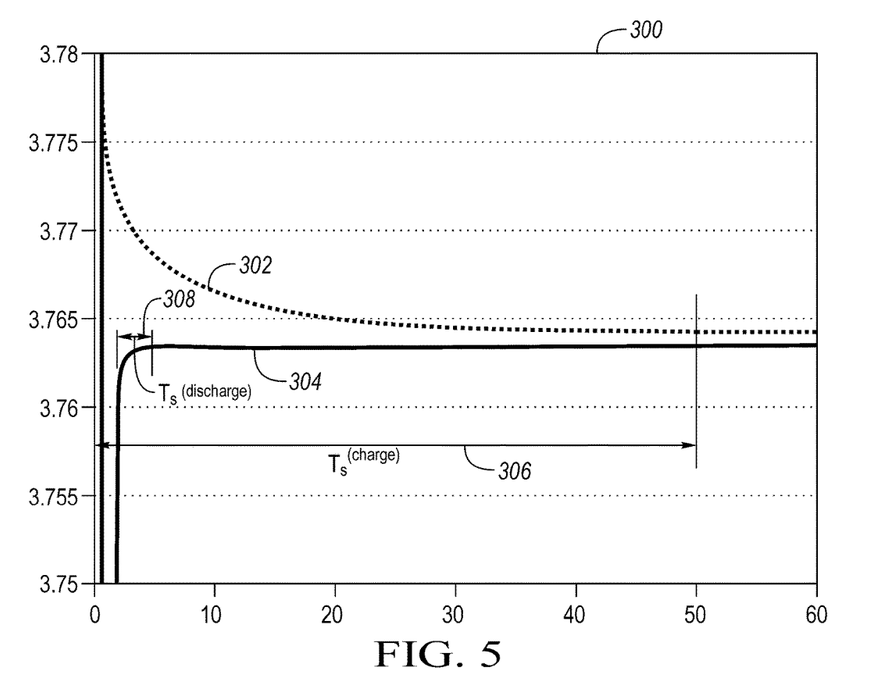
FIG. 5 is a plot of battery voltage settling time after a period of charging with and without a discharge pulse.

FIG. 5 shows a plot 300 of representative voltage stabilization or relaxation times for a battery voltage after a relatively long period of charging and after a relatively short period of discharging. Curve 302 represents the response of the battery terminal voltage 108 after a relatively long charge cycle. That is, a charge voltage is applied to the battery for greater than a predetermined period of time prior to time zero and at time zero, charging is stopped (e.g., zero current). As shown in the plot, the post-charge settling time 306 is approximately fifty seconds. Curve 304 represents the battery terminal voltage 108 when applying a relatively short discharge pulse after the relatively long charge cycle. As shown in the plot, the post-discharge settling time 308, is reduced to approximately five seconds. Similar curves may be obtained after a relatively long period of discharging except that a relatively short charge pulse is applied after a relatively long discharge cycle. The relevant observation is that the open-circuit voltage 100 and the terminal voltage 108 may equalize in less time by reversing the current flow through the battery for a relatively short time. That is, the polarization effects within the battery dissipate in a shorter time after reversing the current. The voltage stabilization time may be reduced by applying a current pulse with the opposite polarity. After a relatively long period of flowing current to the battery (e.g., charging), drawing a relatively short pulse of current from the battery (e.g., discharging) can reduce the voltage relaxation time.

If the battery controller 76 is currently performing a charge cycle, the controller 76 may interrupt the charge cycle and command the discharge current pulse. Note that the battery controller 76 may coordinate with the engine 18 and the electric machines 14 to ensure that appropriate power is available for propulsion and other subsystems. In addition, the battery controller 76 may command external loads 46 to receive the discharge energy from the battery 24. The discharge current pulse may be the result of command one or more of the external loads 46 to draw current from the traction battery 24. For example, a heater may be activated to draw current from the battery 24 for a predetermined time.

Figure 4:
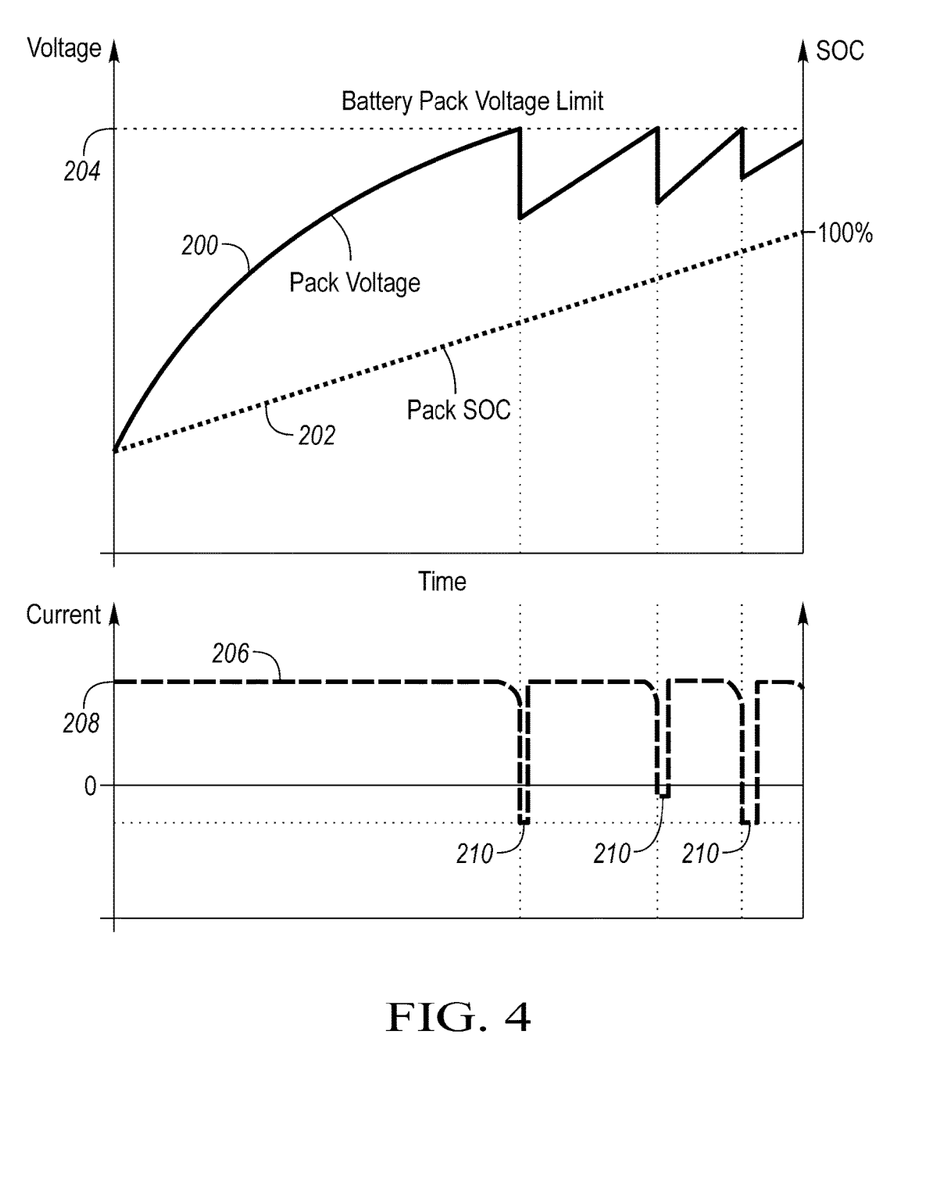
FIG. 4 is a plot of an exemplary battery voltage and current during a charge cycle using the disclosed strategy.

FIG. 4 depicts a plot of the battery terminal voltage 200, battery SOC 202, and battery current 206 during a possible charging cycle. During charging of the traction battery 24, the terminal voltage 200 may approach a battery pack voltage limit 204 at which point, charging may be stopped or modified. Prior to the terminal voltage 200 reaching the battery voltage limit 204 the battery may be charging at a predetermined charge rate which may be at a predetermined current level 208. The predetermined charge current 208 may be a maximum possible charge current. That is, the battery 24 may be charged at a constant current to yield the desired charge rate. During the constant current mode, the current may be controlled by adjusting the magnitude of the terminal voltage 200. The predetermined charge rate may be selected to minimize battery charge time while respecting any maximum current limits of the battery system components.

When charging at the predetermined charge current 208, the difference between the terminal voltage 200 and the open-circuit voltage 100 may be the voltage drop (e.g, product of current and resistance) across the battery impedance. As the open-circuit voltage 100 increases, the terminal voltage 200 may also increase and reach the battery voltage limit 204. This may typically occur at or about a predetermined battery SOC, since the battery SOC is a function of the open-circuit voltage 100. Some systems may be configured to stop charging when the terminal voltage 200 exceeds the battery voltage limit 204. In such a system, the battery 24 may not be fully charged at the end of the charge cycle.

When the terminal voltage 200 meets or exceeds the battery pack voltage limit 204, the current 206 flowing through the battery 24 may be decreased to prevent the terminal voltage 200 from increasing further. The decrease in current 206 causes the battery 24 to charge at a slower charge rate. The battery 24 may be charged in a constant voltage mode at this time. The constant voltage may be the battery pack charge voltage limit 204. In this constant voltage mode, the current 206 may decrease as the open-circuit voltage 100 increases relative to the terminal voltage 200. As the current 206 decreases, the time (e.g., charge time) to charge the battery 24 increases. During this constant voltage charging mode, the charge rate may decrease over time. For example, at a 3C charge rate, the controller may reduce the charge current when the battery SOC is greater than 80%.

One technique to achieve higher currents during charging may be to apply a discharge current pulse 210 when the battery terminal voltage 200 is greater than or equal to the battery pack voltage limit 204. The discharge current pulse 210 may be a discharge current that is applied for a period of time. The discharge current pulse 210 may be sufficient to reduce or reverse the cell polarization and decrease the cell voltage, making it possible to again charge at the predetermined charge current 208. The discharge current pulse 210 may be of a predetermined magnitude and have a predetermined duration. The magnitude and duration of the discharge current pulse 210 may be based on the temperature of the battery 24, the cell open-circuit voltage, and the charge current of the battery 24. This process may be repeated until the battery 24 is fully charged. A magnitude of the discharge rate may be less than a magnitude of the charge rate. For example, for a 3C charge rate, a 1C discharge rate may be selected. The duration of the discharge pulse 210 may be selected to reduce or reverse the cell polarization and dissipate as little stored energy in the battery as possible. In some configurations, the magnitude of the discharge rate may be greater than the magnitude of the charge rate.

As the battery SOC increases, the time between discharge pulses 210 may decrease. Each discharge current pulse 210 reduces the terminal voltage 200 to allow charging to be resumed at a higher current level. The terminal voltage 200 may then rise to the battery voltage limit 204 at which time another discharge pulse 210 may be applied. The controller 76 may monitor the battery SOC to determine when the battery pack 24 is fully charged (e.g., battery SOC approximately 100%). The result is that charging times may be reduced as higher charge currents are used for charging the battery 24. Additionally, the method fully utilizes the battery capacity as charging does not have to end when the battery pack voltage limit 204 is reached. The methods disclosed may be adapted to existing battery management systems as the methods may be implemented in software on the controller 76.

The battery charge rate may be decreased as the battery SOC approaches a target SOC level (e.g., 100%). That is, the predetermined charge current 208 may be adjusted for each charge cycle as the battery SOC approaches a fully charged level. The decreased battery charge rate may compensate for the fact that the battery terminal voltage is the sum of the open-circuit voltage and the product of the charge current and battery resistance. As the battery SOC approaches the target SOC level, the open-circuit voltage approaches the maximum charge voltage. The battery charge rate may be decreased to prevent the terminal voltage from exceeding the maximum charge voltage before cell polarization occurs.

After a discharge current pulse 210, the charge current may be restored to the predetermined charge current 208. As the battery SOC approaches the full-charge level, the predetermined charge current 208 may be decreased. The predetermined charge current 208 may be based on the battery SOC, the battery temperature, and the battery impedance. The predetermined charge current 208 may be selected to maintain the battery terminal voltage within the charge voltage limit. In some configurations, the discharge pulse 210 may be initiated when the charge current begins to decrease from the predetermined charge current 208. In some configurations, the battery voltage limit 204 may correspond to the voltage level at which the charge current decreases.

The discharge current pulse 210 has a magnitude and an associated duration. The magnitude and duration may be based on the magnitude of the charge current and the battery temperature. The magnitude and duration may be based on the battery SOC and the battery impedance. In some configurations, the magnitude of the discharge current pulse 210 may have a smaller magnitude than the charge current. The magnitude and duration of the discharge current pulse 210 may be selected to be a current that is sufficient to reverse cell polarization. The magnitude and duration of the discharge current pulse 210 may be selected to minimize an amount of energy discharged from the battery 24. The magnitude and duration selection may be implemented in a controller as a lookup table. The lookup table may have predetermined values of the discharge current pulse magnitude and duration and be indexed by the charge current and the pack temperature.

Figure 6:
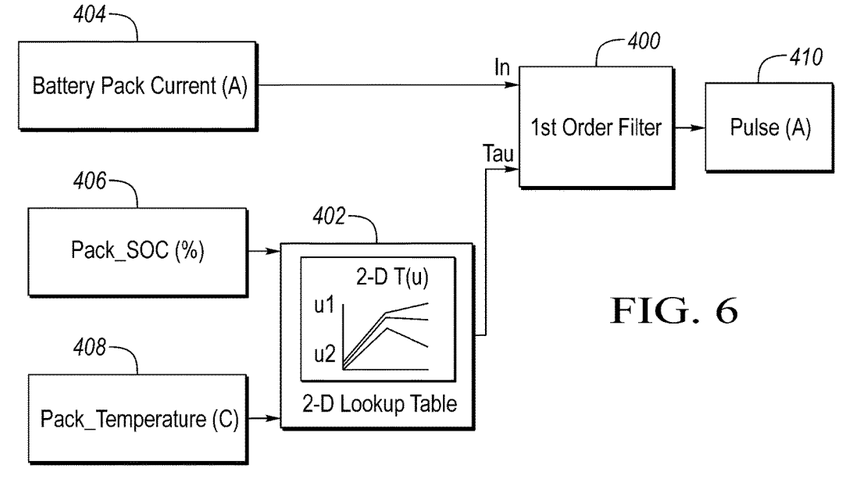
FIG. 6 is a block diagram of a filter for generating a discharge pulse.

FIG. 6 depicts a block diagram of one possible configuration for determining the magnitude of the discharge pulse. A filter 400 may be utilized such that the magnitude of the discharge pulse 410 is based on a filtered version of the battery current 404. The filter 400 may be a first-order low-pass filter having a filter-time constant (e.g., tau) that may be based on a first input 406 and a second input 408. The first input 406 may be the battery pack SOC. The second input may be the battery pack temperature. The filter-time constant may be derived from a lookup table 402 that inputs the first input 406 and the second input 408 and outputs the filter-time constant. The filter 400 may be configured such that over a period of time that is based on the filter-time constant, the output (e.g., discharge current pulse magnitude 410) of the filter 400 approaches the input (e.g., battery current 404). The filter 400 may operate such that a longer duration of a constant battery current will produce a larger magnitude of the discharge current pulse magnitude 410. The magnitude of the discharge pulse may approach the constant battery current magnitude if the duration is equivalent to several filter-time constants.

The principle of the filter operation is that the discharge current pulse magnitude 410 is a function of a battery current 404 magnitude and duration. A large battery current magnitude applied for a long duration will result in a greater discharge pulse magnitude 410 than the same large battery current applied for a short duration.

The duration of the discharge pulse may be a fixed value. For example, the discharge pulse may be set to a predetermined time of one second. In some configurations, the discharge pulse duration may be a variable amount of time based on other parameters. The predetermined time may be based on battery parameters. The magnitude and duration of the discharge current pulse may be sufficient to fully or partially reverse the cell polarization of the battery 24 so that the terminal voltage 108 will be less than the maximum charge voltage limit.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery management system comprising:
    a controller programmed to charge a battery at a predetermined charge current and, in response to a charge current of the battery becoming less than the predetermined charge current at a predetermined voltage limit, activate an electrical load to discharge the battery for a predetermined time and resume charging after the predetermined time at the predetermined charge current to reduce battery charge time.

2. The battery management system of claim 1 wherein the predetermined voltage limit is a battery charge voltage limit at which constant voltage charging is initiated.

3. The battery management system of claim 1 wherein a discharge rate magnitude during the discharge is less than a magnitude defined by the predetermined charge current.

4. The battery management system of claim 1 wherein a current magnitude during the discharge and the predetermined time are based on one or more of a battery temperature, a battery state of charge, and a battery impedance.

5. The battery management system of claim 1 wherein a current magnitude during the discharge and the predetermined time are based on a charge current magnitude during the charge.

6. A vehicle comprising:
    an electrical load;
    a battery; and
    a controller programmed to charge the battery at a predetermined charge current and, in response to a charge current of the battery becoming less than the predetermined charge current at a predetermined voltage limit, operate the electrical load to discharge the battery for a predetermined time and resume charging after the predetermined time at the predetermined charge current to reduce battery charge time.

7. The vehicle of claim 6 wherein the predetermined voltage limit is a battery charge voltage limit at which constant voltage charging is initiated.

8. The vehicle of claim 6 wherein a discharge rate magnitude during the discharge is less than a magnitude defined by the predetermined charge current.

9. The vehicle of claim 6 wherein a current magnitude during the discharge and the predetermined time are based on a battery temperature.

10. The vehicle of claim 6 wherein a current magnitude during the discharge and the predetermined time are based on a charge current magnitude during the charge.

11. A method comprising:
    charging a battery at a predetermined charge current;
    operating an electrical load to discharge the battery for a predetermined time in response to a charge current of the battery becoming less than the predetermined charge current at a predetermined voltage limit; and
    resuming charging the battery after the predetermined time at the predetermined charge current to reduce a battery charge time.

12. The method of claim 11 further comprising terminating the charging when a state of charge of the battery exceeds a predetermined state of charge indicative of a fully charged battery.

13. The method of claim 11 wherein the predetermined voltage limit is a battery charge voltage limit at which constant voltage charging is initiated.

14. The method of claim 11 wherein the predetermined charge current is based on one or more of a state of charge of the battery, a temperature of the battery, and an impedance of the battery.

15. The method of claim 11 wherein a discharge rate magnitude during the discharge is less than a magnitude defined by the predetermined charge current.

16. The method of claim 11 wherein a current magnitude during the discharge and the predetermined time are based on a battery temperature.

17. The method of claim 11 wherein a current magnitude during the discharge and the predetermined time are based on a charge current magnitude during the charge.

* * * * *